United States Patent
Hsu

(10) Patent No.: US 8,724,092 B2
(45) Date of Patent: May 13, 2014

(54) OPTICAL SIGNAL TRANSMISSION STRUCTURE OF LASER DISTANCE MEASURING DEVICE

(75) Inventor: Wei Hsu, Taipei (TW)

(73) Assignee: Weistech Technology Co., Ltd., Taipei (TW)

( * ) Notice: Subject to any disclaimer, the term of this patent is extended or adjusted under 35 U.S.C. 154(b) by 0 days.

(21) Appl. No.: 13/588,630

(22) Filed: Aug. 17, 2012

(65) Prior Publication Data

US 2013/0308118 A1    Nov. 21, 2013

(30) Foreign Application Priority Data

May 18, 2012 (TW) .............................. 101117793 A

(51) Int. Cl.
*G01C 3/08* (2006.01)
(52) U.S. Cl.
USPC ....... 356/4.01; 356/3.01; 356/4.07; 356/5.01; 356/5.09; 356/9; 356/625
(58) Field of Classification Search
USPC ............................... 356/4.01, 3.01, 5.01, 5.09
See application file for complete search history.

(56) References Cited

U.S. PATENT DOCUMENTS

| | | | | |
|---|---|---|---|---|
| 5,200,799 A * | 4/1993 | Maruyama et al. | ........... | 356/394 |
| 5,388,086 A * | 2/1995 | Yamasaki et al. | .......... | 369/44.14 |
| 6,584,695 B1 * | 7/2003 | Chang | .............................. | 30/391 |
| 6,588,616 B1 * | 7/2003 | Ho | ............................... | 220/4.03 |
| 7,274,414 B2 * | 9/2007 | Kim | ................................. | 349/58 |
| 7,954,246 B2 * | 6/2011 | Hajmousa et al. | ............... | 33/227 |
| 8,320,765 B2 * | 11/2012 | Fujimoto et al. | .............. | 398/114 |
| 8,353,318 B2 * | 1/2013 | Ranalletta et al. | ................ | 141/2 |
| 8,528,199 B2 * | 9/2013 | Chikyu | ........................... | 29/842 |
| 2004/0004825 A1 * | 1/2004 | Malard et al. | .................... | 362/21 |
| 2009/0024116 A1 * | 1/2009 | Mulhauser et al. | ................ | 606/9 |
| 2013/0084044 A1 * | 4/2013 | Ertel et al. | ....................... | 385/88 |

* cited by examiner

*Primary Examiner* — Luke Ratcliffe
*Assistant Examiner* — Samantha K Abraham
(74) *Attorney, Agent, or Firm* — Muncy, Geissler, Olds & Lowe, P.C.

(57) ABSTRACT

An optical signal transmission structure of a laser distance measuring device, comprising: a laser pipe, suspended right above a center of a rotation disk, to emit laser beam downward; a light projector module, provided with at least two reflection plates, to reflect laser beam of said laser pipe onto a target; a lens, disposed on said rotation disk, to receive laser beam reflected from said target; and a circuit board, disposed on a lower side of said rotation disk, so laser beam received by said lens is transmitted onto a light sensor element on said circuit board, to produce at least a photoelectric signal, so that circuits on said circuit board determine distance to said target based on said photoelectric signal.

17 Claims, 8 Drawing Sheets

OPTICAL SIGNAL TRANSMISSION STRUCTURE OF LASER DISTANCE MEASURING DEVICE

BACKGROUND OF THE INVENTION

1. Field of the Invention

The present invention relates to a signal transmission technology, and in particular to an optical signal transmission structure of laser distance measuring device.

2. The Prior Arts

Conventionally, the principle of laser distance measurement is to use a laser to emit laser beam to an target, then beam is reflected back to the light emission position, and the time required for transmission and reflection of light beam can be obtained, thus the distance in-between can be derived. To achieve this purpose, the laser distance measuring device must be provided with a laser pipe, to emit laser beam; a lens, serving as a receiver to receive the reflected beam; and an integrated circuit (IC) chip, to calculate the difference of times between the laser pipe emitting the beam, the lens receiving the reflected light. Presently, a 360-degree rotatable laser distance measuring device is available, that is capable of measuring distance of a long range.

However, for this kind of 360-degree rotatable laser distance measuring device, since the laser pipes and lens are provided on the rotation disk, therefore, in case that power is supplied through cable connections, and they tend to wind together in operation while rotating, and then are detached. Also, in repair and maintenance, the power supply portion can not be repaired separately, the whole unit of laser distance measuring device has to be replaced. Moreover, in this kind of laser distance measuring device, usually, at least two circuit boards are required, to process output and input signals of laser pipes and lens respectively. However, for the numerous connections of cables, after rotations at high speed for a long period of time, it is not able to ensure the electrical property of each contact point can function correctly and accurately.

Therefore, the design and performance of laser distance measuring device is not quite satisfactory, and it has much room for improvements.

SUMMARY OF THE INVENTION

In view of the problems and shortcomings of the prior art, a major objective of the present invention is to provide an optical signal transmission structure of a laser distance measuring device, so as to overcome the problems of the prior art.

A major objective of the present invention is to provide an optical signal transmission structure of a laser distance measuring device. Wherein, the principle of laser beam reflection and refraction is used to measure distance, to change the conventional approach that the light transmission and receiving circuits must be disposed on the rotation disk.

Another objective of the present invention is to provide an optical signal transmission structure of a laser distance measuring device. Wherein, the laser pipe is suspended above the rotation disk, so that when the rotation disk rotates, the laser pipe remains stationary, to eliminate the problem that power must be supplied to the laser pipe from the rotation disk.

A further objective of the present invention is to provide an optical signal transmission structure of a laser distance measuring device. Wherein, a plurality of reflection plates are precisely positioned to reflect the laser beam, or an optical fiber is used to guide the laser beam directly to a reflection plate, so that a single reflection plate reflects the laser beam out to the target.

In order to achieve the objectives mentioned above, the present invention provides an optical signal transmission structure of a laser distance measuring device, comprising: a laser pipe, a light projector module, a lens, and a circuit board. Wherein, the laser pipe is suspended directly above the center of a rotation disk, to emit laser beam downward; the light projector module and the lens are provided on the rotation disk, such that the first reflection plate of the light projector module is located directly below the laser pipe, to reflect the laser beam emitted from the laser pipe to a second reflection plate in the light projector module, then reflects it to a target; the lens receives the laser beam reflected from the target, and reflects it to a circuit board on the lower side of the rotation disk, through a third reflection plate at the lower side of the rotation disk, such that the laser beam is irradiated on a light sensor element on the circuit board, to produce at least a photoelectric signal, to enable circuits on the circuit board to determine the distance to the target, based on the photoelectric signal.

Further scope of the applicability of the present invention will become apparent from the detailed description given hereinafter. However, it should be understood that the detailed description and specific examples, while indicating preferred embodiments of the present invention, are given by way of illustration only, since various changes and modifications within the spirit and scope of the present invention will become apparent to those skilled in the art from this detailed description.

BRIEF DESCRIPTION OF THE DRAWINGS

The related drawings in connection with the detailed description of the present invention to be made later are described briefly as follows, in which.

DETAILED DESCRIPTION OF THE PREFERRED EMBODIMENT

The purpose, construction, features, functions and advantages of the present invention can be appreciated and understood more thoroughly through the following detailed description with reference to the attached drawings.

The present invention provides a optical signal transmission structure of a laser distance measuring device, for which optical signal transmission is performed utilizing a laser distance measuring device, to eliminate electrical power cable and movable contact points, so that the laser distance measuring device will not have the problem of inferior electrical contact incurred through long period of rotation.

Figure 1A:
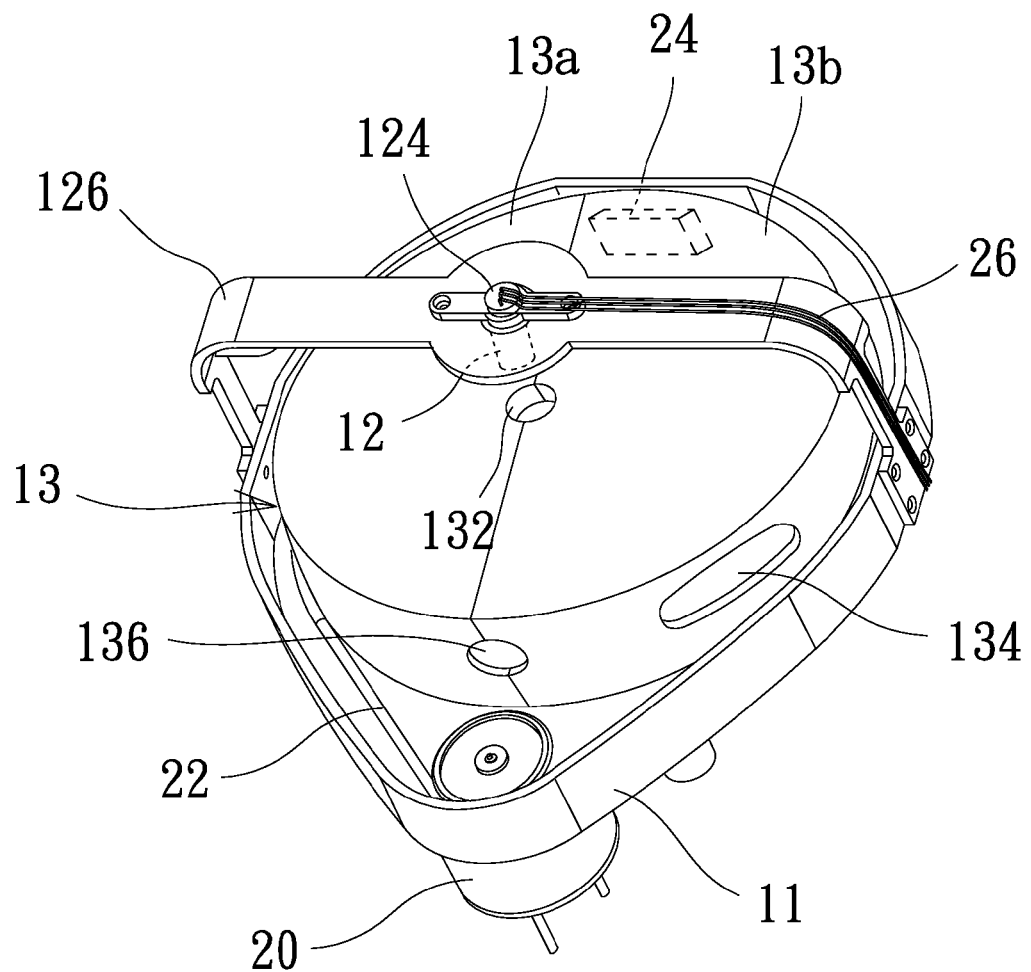
FIGS. 1A and 1B are perspective views of an optical signal transmission structure of a laser distance measuring device having a combined outer cover or without a combined outer cover according to a first embodiment of the present invention.
Figure 1B:
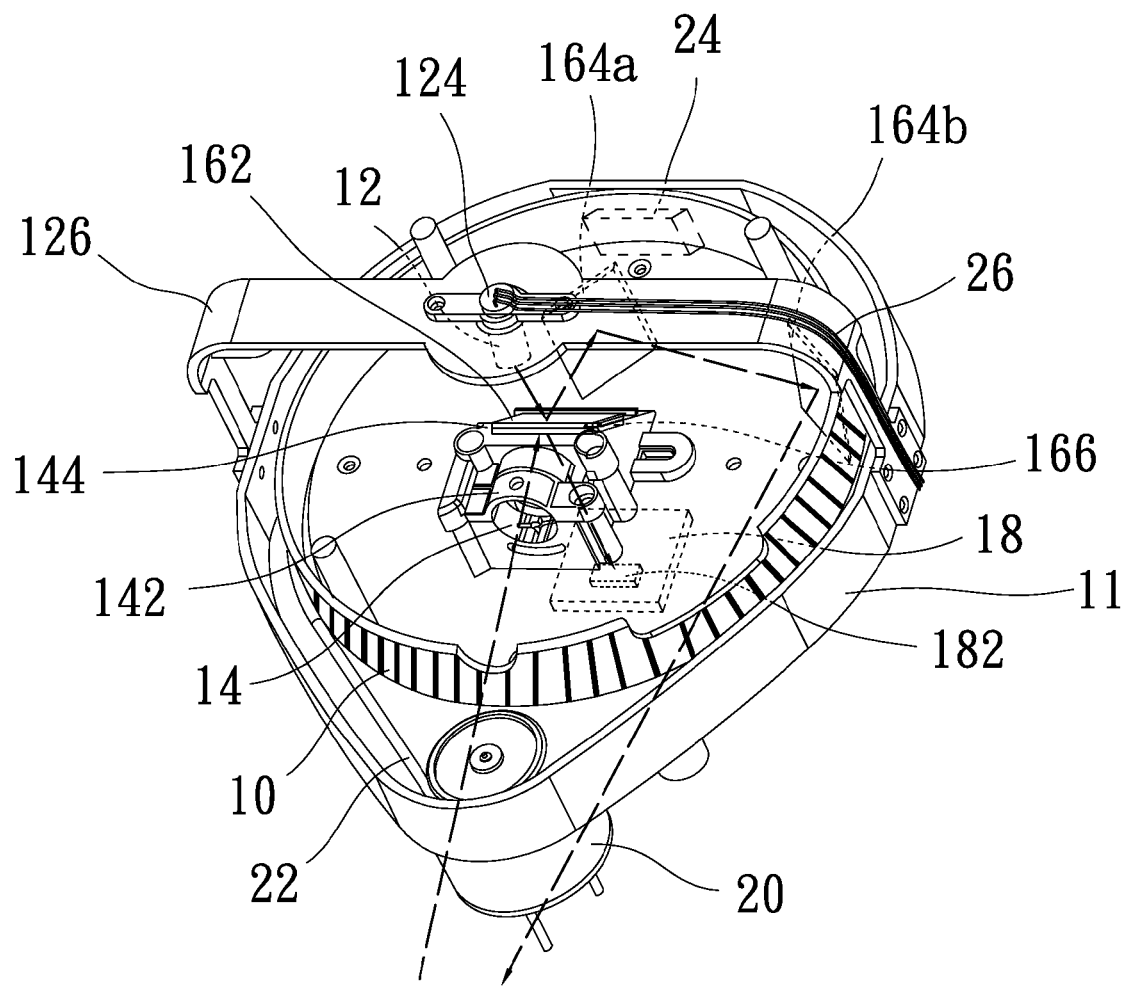

Refer to FIGS. 1A and 1B for perspective views of an optical signal transmission structure of a laser distance measuring device having a combined outer cover and without a combined outer cover according to a first embodiment of the present invention. As shown in FIGS. 1A and 1B, in the first embodiment of the present invention, the laser distance measuring device includes a base 11, on which is provided with a rotation disk 10 and a support frame 126, and a combined outer cover 13 composed of two hemispheres 13a and 13b is covered over the rotation disk 10.

The support frame 126 is of a bridge form and running across the outer shell 11. In the middle of the support frame 126 is provided with an adjustable laser tube clamp seat 124. Below, a laser pipe 12 is provided in the adjustable laser tube clamp seat 124, such that the laser pipe 12 is connected to outside power supply through a power cable 26. The power cable 26 can be placed on the support frame 126, so that when the laser pipe 12 obtains the power from outside, it can emit laser beam downward, to the center of the rotation disk 10 right below.

On the rotation disk 10 is provided with a lens 14, a lens clip plate 142, an adjustable lens seat 144, a first reflection plate 162, two second reflection plates 164a and 164b, and a third reflection plate 166. The adjustable lens seat 144 and lens clip plate 142 are in the center of the rotation disk 10, and are connected to each other. The lens 14 is disposed on lens clip plate 142, to fetch the reflected laser beam. The first reflection plate 162 and the second reflection plates 164a and 164b form together the light projector module of the first embodiment. Wherein, the first reflection plate 162 is disposed on the adjustable lens seat 144, and located right below the laser pipe 12. The first reflection plate 162 forms an angle with the horizontal plane, in this embodiment 45 degrees, to reflect the laser beam onto the second reflection plate 164a, such that the second reflection plates 164a and 164b is perpendicular to the horizontal plane.

The normal line of the second reflection plate 164a forms an angle with the incident laser beam, to reflect the laser beam onto he second reflection plates 164b. The normal line of the second reflection plate 164b likewise forms another angle with the incident laser beam, to reflect the laser beam outward, such as toward a target. The third reflection plate 166 is on the back side of the first reflection plate 162, such that the laser beam reflected by the target will hit upon the third reflection plate 166 through the lens 14, so that the third reflection plate 166 will reflect the laser beam downward. Since the center of the rotation disk 10, and the outer shell 11 right below are empty, so the third reflection plate 166 will reflect the laser beam downward, and out of the rotation disk 10 and the outer shell 11. Specifically, the third reflection plate 166 and the first reflection plate 162 can be considered to form the same plate, that is capable of reflecting light with its double faces after special processing. Or the third reflection plate 166 and the first reflection plate 162 can be glued together back-to-back to form different plates.

Below the outer shell 11 is provided with a circuit board 18, on which is provided with a light sensor element 182, that is below the empty space of the rotation disk 10 and the outer shell 11. Therefore, the laser beam reflected by the third reflection plate 166 will irradiate onto the light sensor element 182, to produce at least a photo-electrical signal. The circuits on circuit board 18 calculate the distance between the target and the laser distance measuring device, based on the difference of photoelectric signals, and the intensity and direction of the photoelectric signals.

Beside the rotation disk 10 is provided with a motor 20, a conveyer belt 22 is wound around the motor 20 and the rotation disk 10, such that when the motor 20 rotates, it will bring the rotation disk 10 into rotation, so the lens 14 can make 360-degree scanning and image taking. For the base 11 on a position opposite to the motor 20 is provided with a turning angle detector 24, while on the outer side of the rotation disk 10 is provided with a plurality of calibrations of dark-and-bright alterations. The turning angle detector 24 senses the variations of the dark-and-bright alterations, to obtain the rotation angle of the rotation disk 10, then transmits it to the circuit board 18. The circuit board 18 in turn combines this rotation angle with the photoelectrical signal sensed by the light sensor element 182, to figure out the direction and distance between the target and the laser distance measuring device.

The combined outer cover 13 is composed of two hemispheres 13a and 13b, with its center provided with a light incident hole 132, located right below the laser pipe 12, so that the laser beam irradiates onto the first reflection plate 162 through the light incident hole 132. In front of the combined outer cover 13 is disposed a light exit hole 134 and a light receiving hole 136, so that the laser beam reflected by the second reflection plate 164b is exited from the light exit hole 134, and the laser beam reflected back from the target is received by the lens 14 through the light receiving hole 136.

Subsequently, the light transmission route of the first embodiment of the present invention is described as follows. Firstly, when the laser pipe 12 emits laser beam, it transmits through the combined outer cover 13 from the light incident hole 132, to irradiate onto the first reflection plate 162. Next, the first reflection plate 162 reflects the laser beam to a second reflection plate 164a, which in turn reflects the laser beam to another second reflection plate4 164b, and that reflects and aims the laser beam to the target. Then, the lens 14 receives the laser beam reflected from the target, such that the laser beam transmits through the lens 14 to irradiate onto the third reflection plate 166, and it then reflects the laser beam downward onto the light sensor element 182 of the circuit board 18, to complete the light transmission route.

Figure 2A:
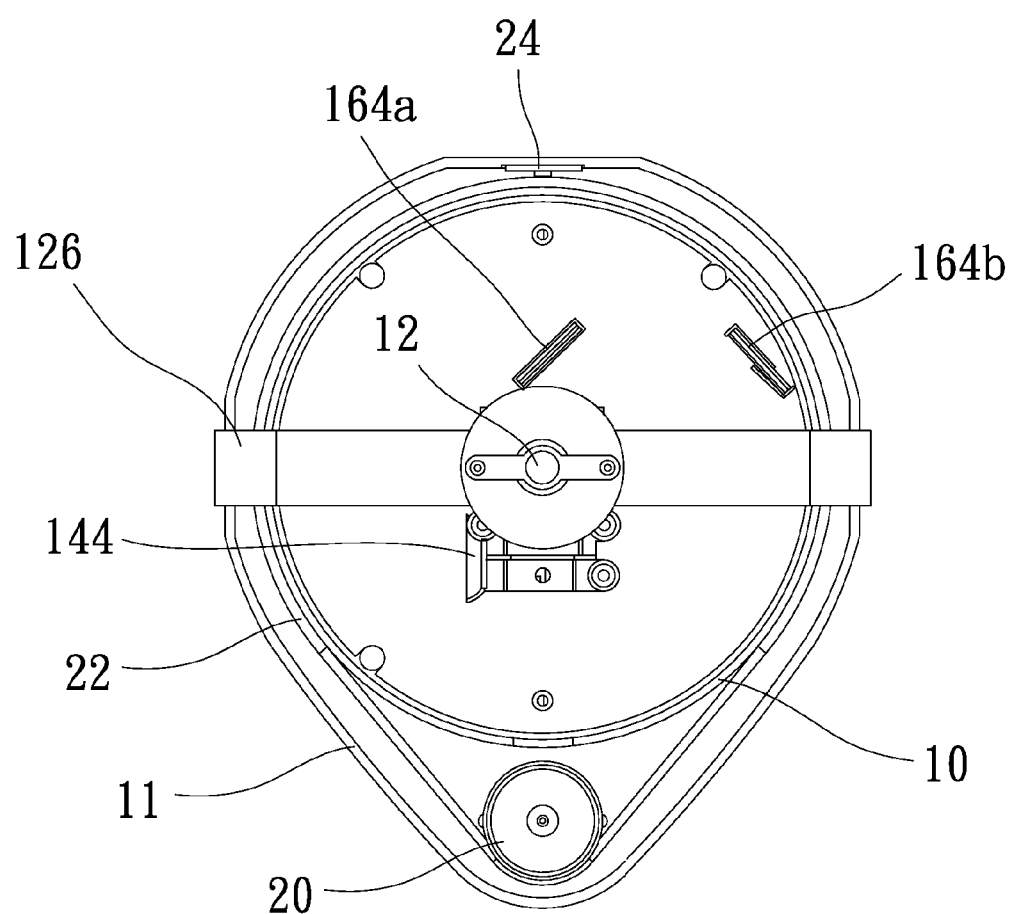
FIG. 2A is a top view of an optical signal transmission structure of a laser distance measuring device according to a first embodiment of the present invention.
Figure 2B:
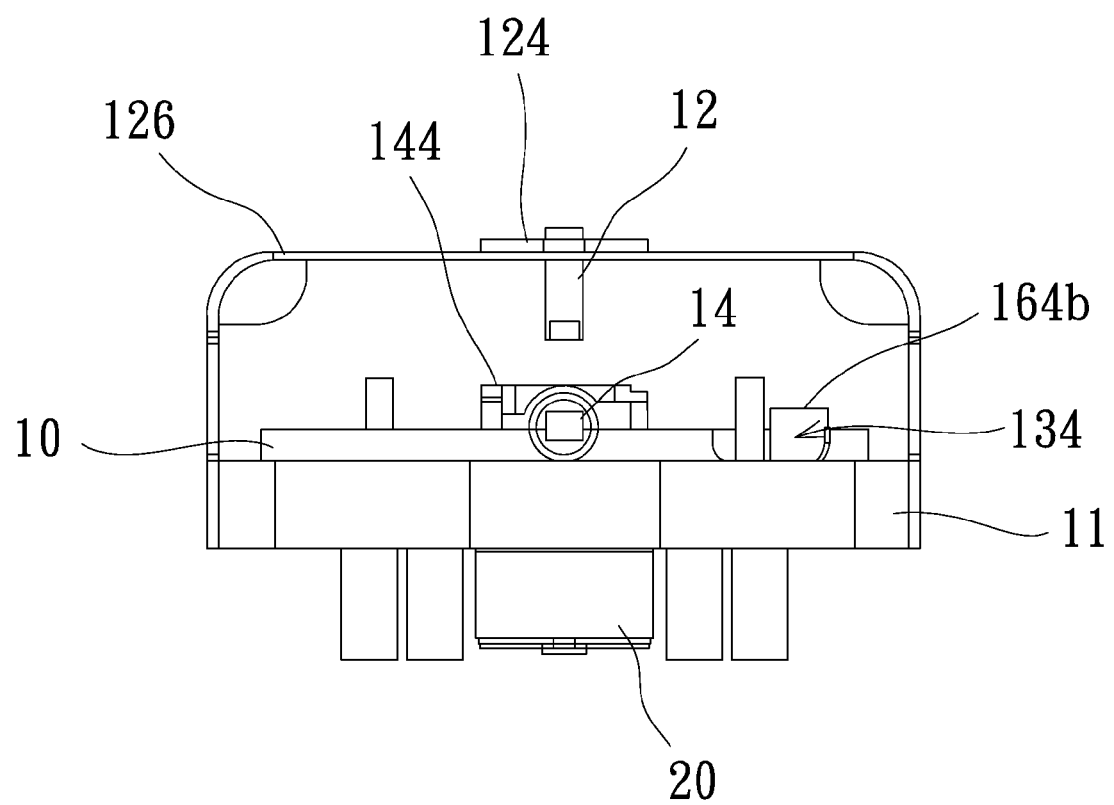
FIGS. 2B and 2C are front view and side view of an optical signal transmission structure of a laser distance measuring device according to a first embodiment of the present invention.
Figure 2C:
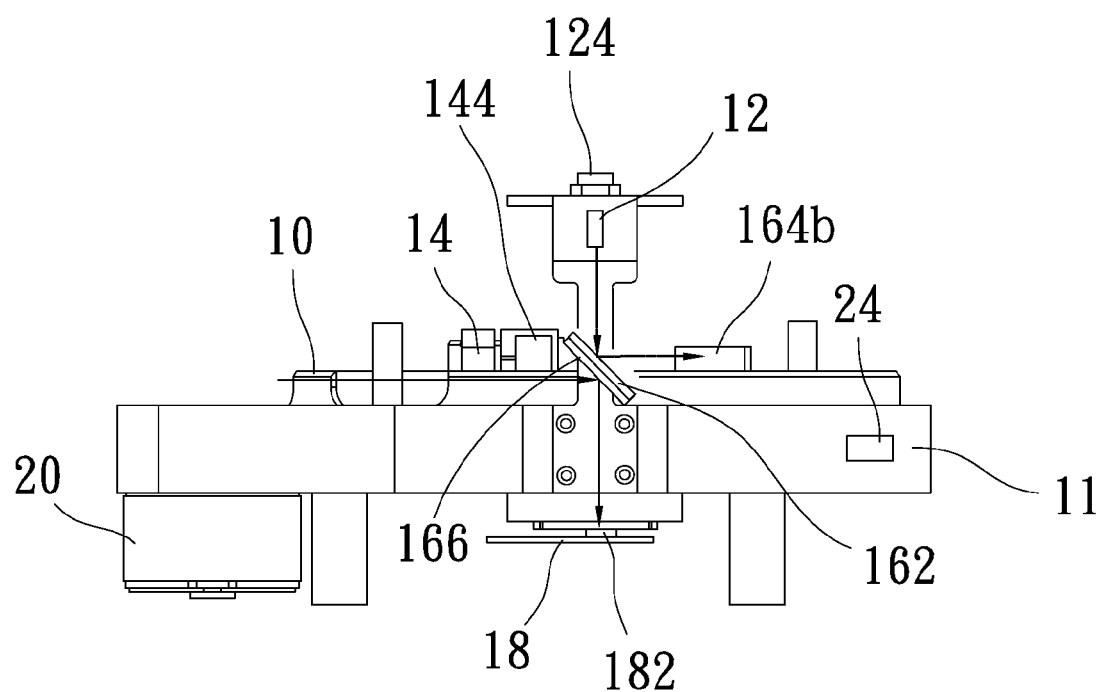

Then, refer to FIG. 2A for a top view of an optical signal transmission structure of a laser distance measuring device according to a first embodiment of the present invention. Wherein, it can be seen that the disposition angles of two second reflection plates 164a and 164b. Subsequently, refer to FIG. 2B for a front view of an optical signal transmission structure of a laser distance measuring device according to a first embodiment of the present invention. Wherein, the motor 20 is placed in front of the circuit board (not shown) to avoid the light sensor element being interfered by the laser beam reflected from the target. Also, refer to FIG. 2C for a side view of an optical signal transmission structure of a laser distance measuring device according to a first embodiment of the present invention. Wherein, it can be seen that the laser pipe 12, the first reflection plate 162, the third reflection plate 166, and the light sensor element 182, are all located on a vertical light transmission route. Also, the empty space in the rotation disk 10 and the outer shell allows the laser beam to transmit through and irradiate on the light sensor element 182. In addition, it can be seen the relative positions of the first reflection plate 162 and the third reflection plate 166. In FIG. 2C, the two plates are glued together back to back. However, through special processing, the two can be formed integrally into a double-face reflection plate.

Figure 3A:
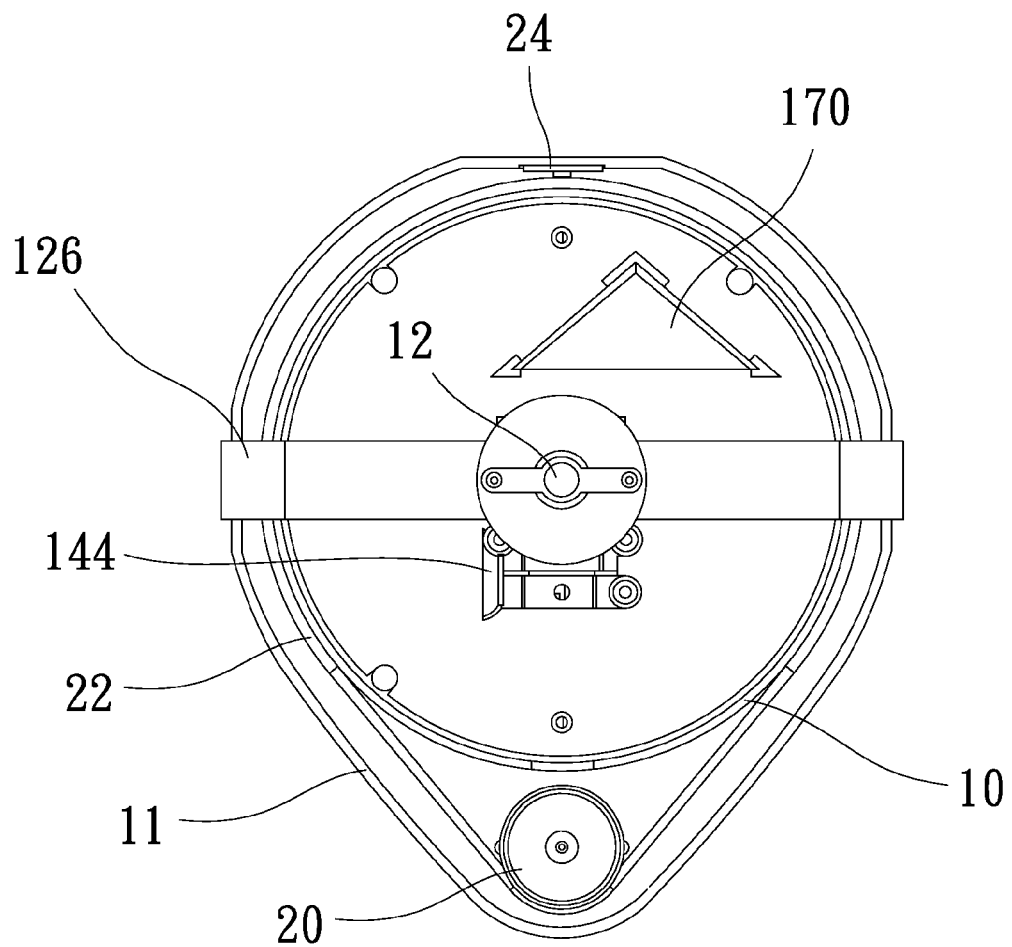
FIG. 3A is a top view of an optical signal transmission structure of a laser distance measuring device using a prism as the second reflection plate according to a first embodiment of the present invention.
Figure 3B:
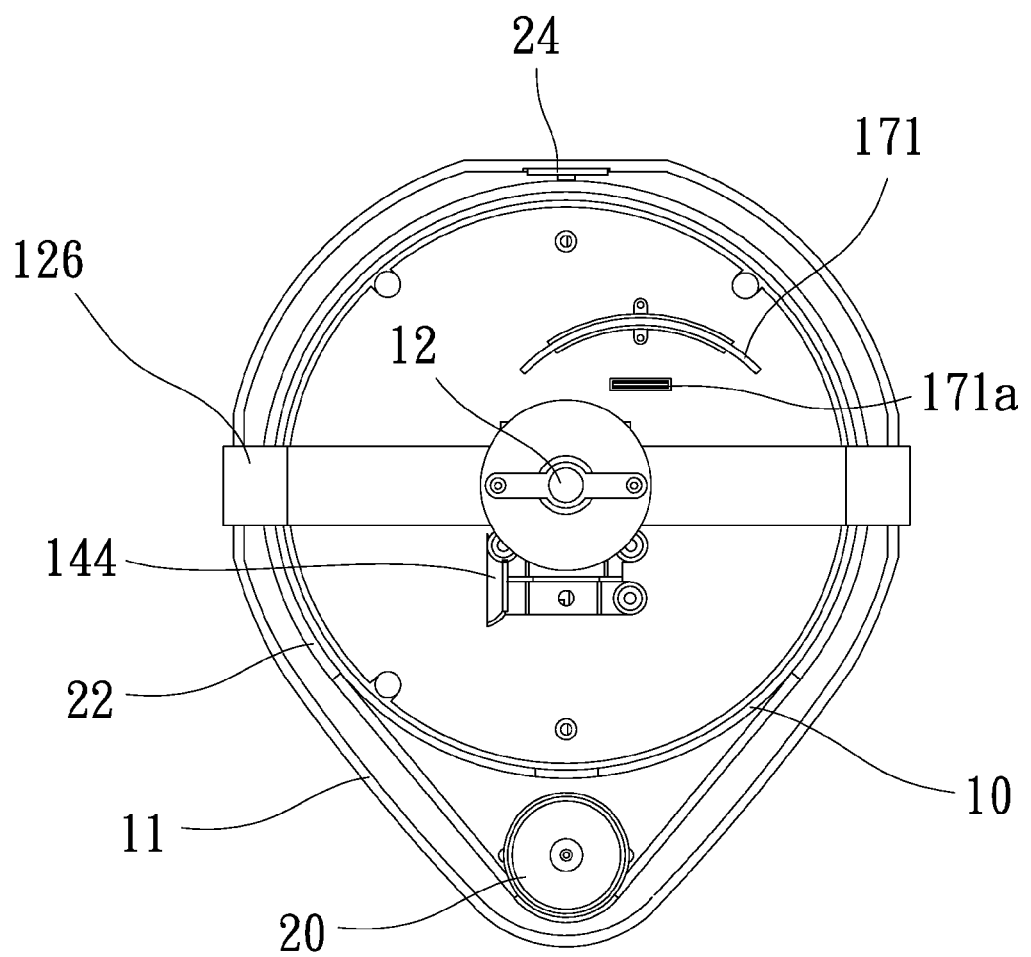
FIG. 3B is a top view of an optical signal transmission structure of a laser distance measuring device using a concave plate as the second reflection plate according to a first embodiment of the present invention.

Moreover, the second reflection plates 164a and 164b of the first embodiment as shown in FIG. 2A can be integrated to form a single piece prism 170 as shown in FIG. 3A. Or, the second reflection plate 164a in FIG. 2A can be made into a concave plate 171 of a larger area as shown in FIG. 3B, while the second reflection plate 164b is moved forward, thus achieving rearrangement of the plates. In this way, the light emitted by the laser pipe 12 can be transmitted to the target through the light transmission route mentioned above.

Figure 4:
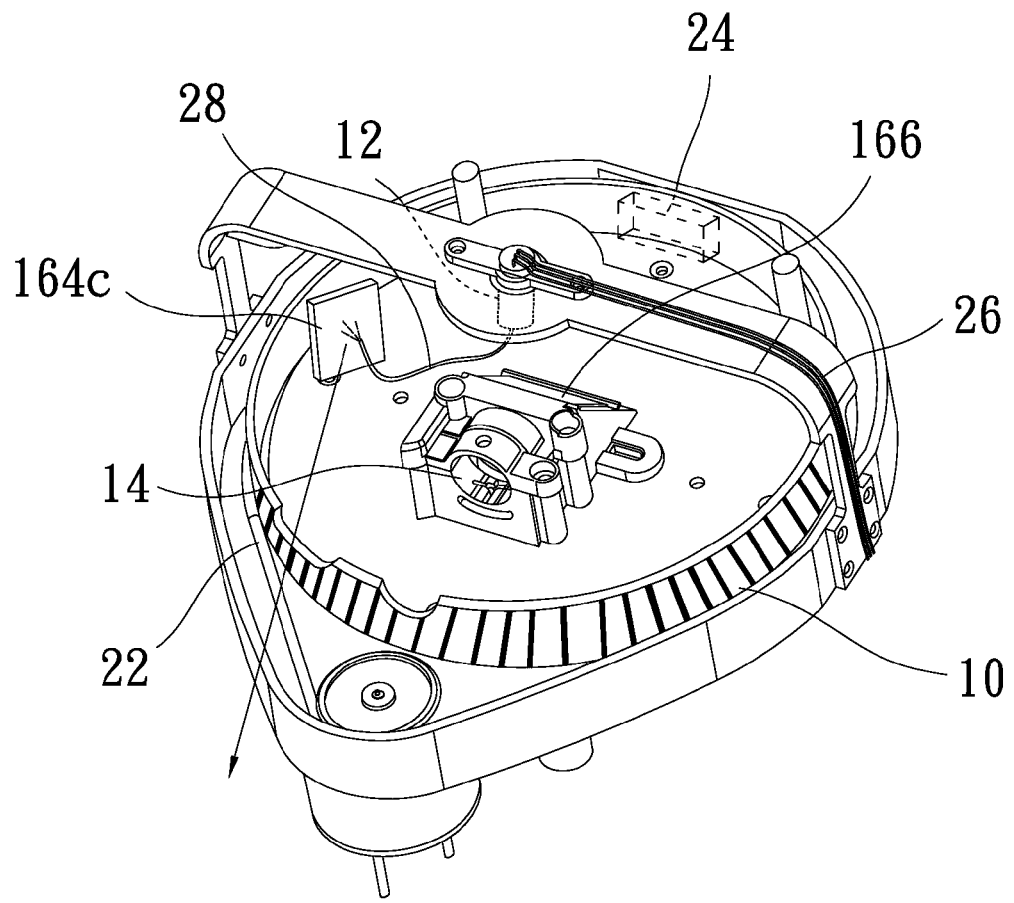
FIG. 4 is a perspective view of an optical signal transmission structure of a laser distance measuring device according to a second embodiment of the present invention.

FIG. 4 is a perspective view of an optical signal transmission structure of a laser distance measuring device without the combined outer cover according to a second embodiment of the present invention. In this embodiment, the first reflection plate is not required, therefore, the light projector module only contains a second reflection plate 164c. An optical fiber 28 is disposed below the laser pipe 12, so that laser beam emitted by the laser pipe 12 is transmitted directly into the optical fiber 28, and the optical fiber 28 in turn guides the laser beam to the second reflection plate 164c. Then, the second reflection plate 164c reflects and transmits the laser beam to a target. When the laser beam is reflected back from the target, the optical transmission route is the same as that of the first embodiment.

In the present invention, the laser pipe is not disposed on the rotation disk, therefore, there could have no problems of the prior art that the power supply cables of the laser pipe may tangle with other wires during rotations of the rotation disk, and there could be no movable electric connection points either. Also, since the laser pipe is located right above the center of the rotation disk, and the first reflection plate is located right below the laser pipe, so that the rotations of the rotation disk will not affect the transmission of light in optical transmission route between the laser pipe and the light projector module.

Summing up the above, the present invention provides an optical signal transmission structure of a laser distance measuring device. Wherein, the laser pipe is hung above the rotation disk, and a plurality of reflection plates are used to reflect the laser beam. The circuits on the circuit board calculate distance to the target, based on the optical transmission route, hereby eliminating the necessity to put circuit board, connection wires, and rotation connection points on the rotation disk, thus simplifying the structure and prolonging service life of the laser distance measuring device.

The above detailed description of the preferred embodiment is intended to describe more clearly the characteristics and spirit of the present invention. However, the preferred embodiments disclosed above are not intended to be any restrictions to the scope of the present invention. Conversely, its purpose is to include the various changes and equivalent arrangements which are within the scope of the appended claims.

What is claimed is:

1. An optical signal transmission structure of a laser distance measuring device, comprising:
    a laser pipe, suspended statically and directly above a center of a rotation disk, to emit laser beam;
    a light projector module, provided with at least two reflection plates, to project laser beam of said laser pipe onto a target;
    a lens, disposed on said rotation disk, to receive laser beam reflected from said target; and
    a circuit board, disposed statically in a position opposite to that of said rotation disk, laser beam received by said lens is irradiated onto a light sensor element on said circuit board, to produce at least a photoelectric signal, so that circuits on said circuit board determine distance to said target based on said at least a photoelectric signal,
    wherein laser beam emitted by said laser pipe is irradiated onto a center of said rotation disk in rotation, and wherein a principal axis of said lens intercepts a vertical dotted line through center of said rotation disk.

2. The optical signal transmission structure of a laser distance measuring device as claimed in claim 1, further comprising:
    a base, circumference of its hollow axis is fastened to said rotation disk, a bridge-shape frame is provided between two opposite positions on edges of said base, and an adjustable laser tube clamp seat is provided at center of said frame, so that said laser pipe is fixed onto said frame by means of said adjustable laser tube clamp seat.

3. The optical signal transmission structure of a laser distance measuring device as claimed in claim 2, wherein said rotation disk is provided on said base.

4. The optical signal transmission structure of a laser distance measuring device as claimed in claim 1, further comprising:
    a combined outer cover, disposed on said base to cover said rotation disk, center of said combined outer cover is provided with a light incident hole, located right below said laser pipe, so that laser beam irradiates onto said light projector module through said light incident hole.

5. The optical signal transmission structure of a laser distance measuring device as claimed in claim 4, wherein a light exit hole and a light receiving hole are provided on a side of said combined outer cover, such that laser beam transmitted through said light projector module is transmitted to said target through said light exit hole, and laser beam reflected from said target is transmitted to said lens through said light receiving hole.

6. The optical signal transmission structure of a laser distance measuring device as claimed in claim 1, wherein said light projector module further includes a first reflection plate and at least a second reflection plate, said first reflection plate is provided on said rotation disk, and right below said laser pipe, to reflect laser beam of said laser pipe to said at least a second reflection plate, then said at least a second reflection plate reflects laser beam to said target.

7. The optical signal transmission structure of a laser distance measuring device as claimed in claim 6, wherein an adjustable lens seat and a lens clamp plate are provided on said rotation disk, to receive said first reflection plate and said lens, so that inclination angle of said first reflection plate is adjustable.

8. The optical signal transmission structure of a laser distance measuring device as claimed in claim 5, wherein said first reflection plate forms an angle of 45 degrees with a horizontal plane.

9. The optical signal transmission structure of a laser distance measuring device as claimed in claim 6, wherein when number of said at least one second reflection plate is two, laser beam is reflected three times to reach said target.

10. The optical signal transmission structure of a laser distance measuring device as claimed in claim 6, wherein said light projector module further includes a third reflection plate, disposed at a back side of said first reflection plate, such that laser beam reflected by said target is transmitted onto said third reflection plate through said lens, then it is reflected by said third reflection plate downward to said light sensor element on said circuit board.

11. The optical signal transmission structure of a laser distance measuring device as claimed in claim 10, wherein said third reflection plate and said first reflection plate are of a same plate, thus they are made into double-face reflection plate after special processing; or said third reflection plate and said first reflection plate are glued back-to-back into two different plates.

12. The optical signal transmission structure of a laser distance measuring device as claimed in claim 1, further comprising:
   a motor, provided on a side of said rotation disk, a conveyor belt winding around axis of said motor is connected to said rotation disk, so that when said axis of said motor rotates, it brings said rotation disk into rotation.

13. The optical signal transmission structure of a laser distance measuring device as claimed in claim 1, wherein a plurality of calibrations of dark-and-bright alternations are provided on an outer side of said rotation disk, and a turning angle detector on said base is used to fetch outside image of said rotation disk, to determine turning angle of said rotation disk based on dark-and-bright alterations of said calibrations.

14. The optical signal transmission structure of a laser distance measuring device as claimed in claim 1, wherein when said rotation disk rotates, light spots of said photoelectric signals move in a range of said light sensor element.

15. The optical signal transmission structure of a laser distance measuring device as claimed in claim 1, wherein said circuit board is provided at bottom of said base, and is connected to an outside device, to transmit distance to said target to said outside device.

16. The optical signal transmission structure of a laser distance measuring device as claimed in claim 1, wherein said laser pipe is connected to an outside power source through a set of power cables, and said set of power cables are placed on said frame of said base.

17. The optical signal transmission structure of a laser distance measuring device as claimed in claim 1, wherein when number of said at least two reflection plates of said light projector module is two, it further includes an optical fiber, with its one end connected to said laser pipe to receive laser beam, and with its other end aimed at one of said at least two reflection plates, to transmit laser beam to said reflection plates, then said reflection plates reflects laser beam directly toward said target.

* * * * *